(12) United States Patent
Ova et al.

(10) Patent No.: US 10,008,113 B2
(45) Date of Patent: *Jun. 26, 2018

(54) HYBRID DISTRIBUTED PREDICTION OF TRAFFIC SIGNAL STATE CHANGES

(71) Applicant: Traffic Technology Services, Inc., Beaverton, OR (US)

(72) Inventors: Kiel Roger Ova, Roberts, MT (US); Thomas Bauer, Beaverton, OR (US); Jingtao Ma, Portland, OR (US); Kyle Zachary Hatcher, Portland, OR (US)

(73) Assignee: Traffic Technology Services, Inc., Beaverton, OR (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/179,850

(22) Filed: Jun. 10, 2016

(65) Prior Publication Data

US 2016/0284215 A1 Sep. 29, 2016

Related U.S. Application Data

(63) Continuation-in-part of application No. 14/252,491, filed on Apr. 14, 2014, now Pat. No. 9,396,657.

(Continued)

(51) Int. Cl.
*G05D 1/00* (2006.01)
*G05D 3/00* (2006.01)
(Continued)

(52) U.S. Cl.
CPC ......... *G08G 1/096775* (2013.01); *B60R 1/00* (2013.01); *G06K 9/00825* (2013.01);
(Continued)

(58) Field of Classification Search
CPC ........... G08G 1/096775; G08G 1/0116; G08G 1/0141; G08G 1/09623; G08G 1/096716;
(Continued)

(56) References Cited

U.S. PATENT DOCUMENTS

| 5,940,010 A | 8/1999 | Sasaki |
| 6,519,599 B1 | 2/2003 | Chickering et al. |

(Continued)

FOREIGN PATENT DOCUMENTS

| EP | 1615190 A2 | 1/2006 |
| EP | 2824647 A1 | 1/2015 |

(Continued)

OTHER PUBLICATIONS

European Patent Office; International Search Report and Written Opinion of the EPO (ISA) PCT/US2016/038817; Oct. 19, 2016; 14 Pages.

(Continued)

*Primary Examiner* — Rachid Bendidi
(74) *Attorney, Agent, or Firm* — FisherBroyles, LLP; Micah D. Stolowitz

(57) ABSTRACT

Computer-implemented predictions of upcoming traffic control signal states or state changes can be used to improve driver convenience, safety, and fuel economy. Such information can be used advantageously by a human operator, or by an autonomous or semi-autonomous vehicle control system. Predictions can be computed with suitable machines installed in a vehicle, in cooperation with a remote back-end server system. The prediction computations in the vehicle may be supported by data communicated to the vehicle computing machinery over various wireless communications, including telecom systems, DSRC, etc.

18 Claims, 11 Drawing Sheets

Related U.S. Application Data

(60) Provisional application No. 62/185,833, filed on Jun. 29, 2015, provisional application No. 61/811,655, filed on Apr. 12, 2013.

(51) Int. Cl.
  *G06F 7/00* (2006.01)
  *G08G 1/0967* (2006.01)
  *B60R 1/00* (2006.01)
  *G06K 9/00* (2006.01)
  *G08G 1/01* (2006.01)
  *G08G 1/0962* (2006.01)

(52) U.S. Cl.
  CPC ......... *G08G 1/0116* (2013.01); *G08G 1/0129* (2013.01); *G08G 1/0141* (2013.01); *G08G 1/09623* (2013.01); *G08G 1/096716* (2013.01); *G08G 1/096741* (2013.01); *G08G 1/096758* (2013.01)

(58) Field of Classification Search
  CPC ....... G08G 1/096741; G08G 1/096758; G08G 1/0129; G08G 1/0145; G08G 1/082; G08G 1/096; G08G 1/096827; G08G 1/6827; G08G 1/096844; G06K 9/00825; G06K 9/00818; B60R 1/00
  See application file for complete search history.

(56) References Cited

U.S. PATENT DOCUMENTS

| | | | |
|---|---|---|---|
| 6,989,766 B2 * | 1/2006 | Mese | G08G 1/096716 340/907 |
| 8,761,991 B1 | 6/2014 | Ferguson | |
| 9,043,138 B2 | 5/2015 | Ginsberg | |
| 9,396,657 B1 | 7/2016 | Bauer | |
| 2003/0128135 A1 | 7/2003 | Poltorak | |
| 2004/0189489 A1 | 9/2004 | Terui | |
| 2005/0015675 A1 | 7/2005 | Garner | |
| 2005/0187701 A1 | 8/2005 | Baney | |
| 2006/0009188 A1 | 1/2006 | Kubota | |
| 2007/0027583 A1 | 2/2007 | Tamir | |
| 2007/0222638 A1 | 9/2007 | Chen | |
| 2009/0070031 A1 | 3/2009 | Ginsberg | |
| 2011/0037618 A1 | 2/2011 | Ginsberg | |
| 2011/0037619 A1 | 2/2011 | Ginsberg | |
| 2011/0040621 A1 | 2/2011 | Ginsberg | |
| 2011/0093178 A1 | 4/2011 | Yamada | |
| 2011/0115646 A1 | 5/2011 | Matsumura | |
| 2012/0026014 A1 * | 2/2012 | Miller | G08G 1/07 340/929 |
| 2012/0139754 A1 | 6/2012 | Ginsberg | |
| 2012/0139755 A1 | 6/2012 | Ginsberg | |
| 2012/0179358 A1 | 7/2012 | Chang | |
| 2012/0274481 A1 | 11/2012 | Ginsberg | |
| 2012/0288138 A1 | 11/2012 | Zeng | |
| 2013/0076538 A1 | 3/2013 | Uno | |
| 2013/0131980 A1 | 5/2013 | Ginsberg | |
| 2013/0166109 A1 | 6/2013 | Ginsberg | |
| 2013/0253754 A1 * | 9/2013 | Ferguson | G05D 1/0231 701/28 |
| 2013/0297124 A1 | 11/2013 | Be | |
| 2014/0032089 A1 | 1/2014 | Aoude | |
| 2014/0046509 A1 * | 2/2014 | Otake | G08G 1/095 701/2 |
| 2014/0277986 A1 | 9/2014 | Mahler | |
| 2015/0015421 A1 * | 1/2015 | Krijger | G08G 1/0129 340/932 |
| 2015/0046055 A1 | 2/2015 | Yamada | |
| 2016/0156881 A1 * | 6/2016 | Guan | G06K 9/00825 348/148 |
| 2016/0203717 A1 | 7/2016 | Ginsberg | |
| 2016/0293006 A1 | 10/2016 | Bauer | |
| 2016/0339959 A1 * | 11/2016 | Lee | B62D 15/0265 |

FOREIGN PATENT DOCUMENTS

| | | |
|---|---|---|
| WO | 2011019445 | 2/2011 |
| WO | 2011163006 | 12/2011 |
| WO | 2013109472 | 7/2013 |
| WO | 2017003793 | 1/2017 |

OTHER PUBLICATIONS

Maile M. et al., Cooperative Intersection Collision Avoidance System or Violations (CICAS-V) for Avoidance of Ciolation-Based Intersection Crashes, Mercedes-Benz Research and Development North America, Inc. USA, Paper No. 09-0118, 2009, fourteen pages [online] [retrieved Jun. 5, 2012] retrieved from the internet URL http://nrd.nhtsa.dot.gov/pdf/esv/es21/09-0118.pdf.

Aoude G. et al.; Behavior Classification Algorithms at Inersections and Validation using Naturalistic Data; Jul. 2011; six pages [online] [retrieved Jun. 5, 2012] URL http://acl.mit.edu/papers/IV11AoudeDesarajuLaurensHow.pdf.

Gminsidenews.com; DCS Preps Safety System to Previent Red-Light Running; Jun. 18, 2006, eleven pages [-online] [retrieved Jan. 23, 2012] retrieved from the internet http://www.gminsidenews.com/forums/f58/dcx-preps-safety-system-prevent-red-light-running-32921.

Faezipour, M et al.; Progress and Challenges in Intelligent Vehicle Area Networks; Communication of the ACM, Feb. 2012; pp. 90-100, vol. 55, No. 2.

Strauss S., Traffic Magic, University Affairs, Dec. 7, 2009, [online] [retrieved Aug. 17, 2010] retrieved from the internet URL http://www.universityaffairs.ca/Print.aspx?id=7102.

Vaughan Inman and Gregory Davis; The Effects of In-Vehicle and Infrastructure-Based Collision Warnings at Signalized Intersections; US Department of Transportation, Federal Highway Administration; Publication No. FHWA-HRT-09-049; Dec. 2009 (46 pages).

PCT, International Search Report and Written Opinion of the Icnternational Searching Authority, PCT/US2016/038817, dated Oct. 19, 2016, 14 pages.

* cited by examiner

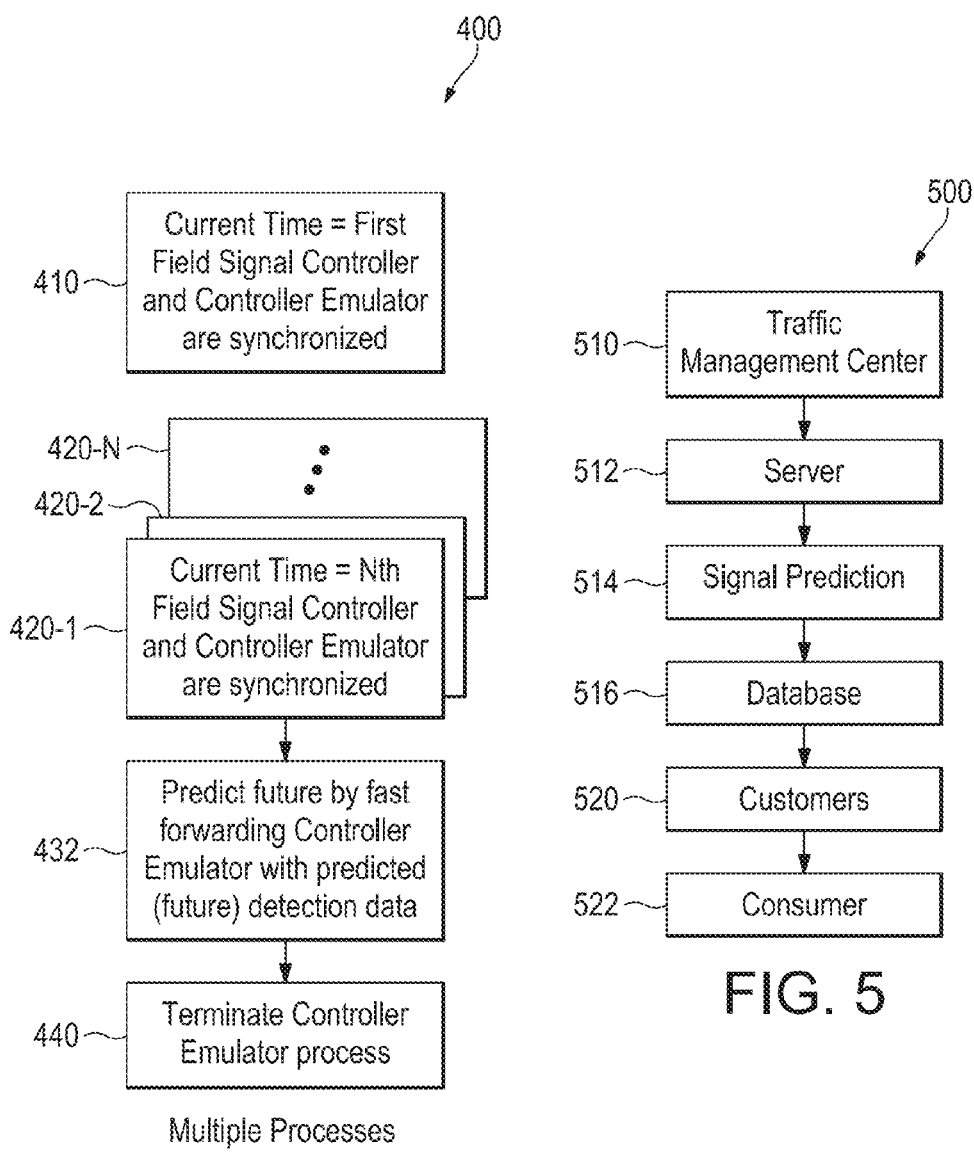

BACK-END PROCESS

HYBRID DISTRIBUTED PREDICTION OF TRAFFIC SIGNAL STATE CHANGES

RELATED APPLICATIONS

This application is a non-provisional of U.S. provisional application No. 62/185,833 filed Jun. 29, 2015. This application also is a continuation-in-part of, and claims priority to, U.S. application Ser. No. 14/252,491 filed Apr. 14, 2014, now U.S. Pat. No. 9,396,657. All of said applications are incorporated herein by this reference as though fully set forth.

TECHNICAL FIELD

This disclosure pertains to vehicles and to electric traffic signals of the sort commonly found at street intersections, freeway ramps, and the like, for directing vehicular traffic.

BACKGROUND

It has been suggested that predicting traffic signal changes would be useful. For example, Ginsberg refers to predicting a likely remaining duration of the traffic signal in a particular state; see U.S. Pat. App. Pub. No. 2013/0166109. The need remains, however, for a practical and effective solution to generating predictions of future traffic signal state changes and communicate that information to users (human or autonomous systems) in a timely manner.

BRIEF DESCRIPTION OF THE DRAWINGS

FIG. 4 is a simplified flow diagram of an alternative process for short-term signal status prediction based on using a plurality of control emulation processes.

FIG. 5 is a simplified high-level diagram showing information flow in some embodiments and applications of the present disclosure.

DETAILED DESCRIPTION

Figure 1:
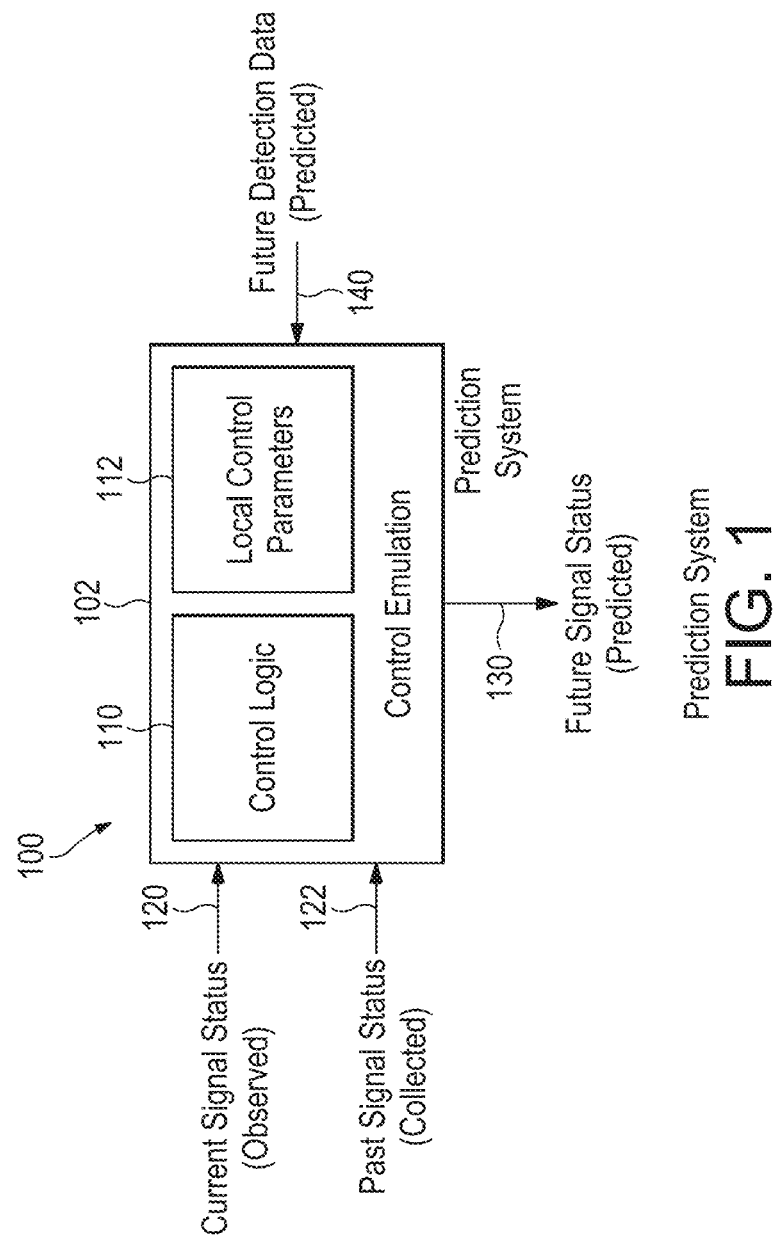
FIG. 1 is a simplified conceptual diagram of a traffic control prediction system.

Glossary: Some of the terms used herein may be defined as follows.

Traffic Signal or simply "Signal". Refers to a set of traffic control devices, including "signal heads" generally deployed at a single street intersection, highway ramp or other location. A traffic signal is controlled by an associated Field Signal Controller ("FSC").

Field Signal Controller ("FSC"). Refers to a controller, generally comprising electronics and/or software, arranged to control a Traffic Signal. The Field Signal Controller may be located at or near the corresponding Traffic Signal location, such as a street intersection, or at a central traffic management center, or some combination of the two. An FSC may operate according to various rules, algorithms, and inputs, depending on the location and circumstances of the signal it controls. For example, raw inputs may be provided to the FSC by a Detector.

Field Signal Controller State. Refers to the state of an FSC, for example, the status of one or more internal timers, and the state or status of one more Indicators controlled by the FSC. The FSC has a given state at a specific time.

Cycle Time. An FSC may change state according to a Cycle Time, although the cycle time may not always be constant. For example, a weekday cycle time may differ from a weekend cycle time for a given FSC.

Detector. Refers to an electrical, magnetic, optical, video or any other sensor arranged to provide raw input signals to an FSC in response to detection of an entity such as a motor vehicle, transit vehicle, bicycle or pedestrian. The input signal may correspond to the arrival, presence, or departure of the vehicle. A detector also may be activated manually, for example, by a pedestrian or a driver pressing a button. Of course, a detector also may be initiated remotely or wirelessly, similar to a garage or gate opener. In general, Detectors provide raw inputs or stimuli to an FSC.

Controller Emulator. Is discussed in more detail below, but in general may comprise computer hardware or other electronics, and/or software, wherever located, that is arranged to mimic or emulate the operation of an FSC.

Indicator. Refers to one or more signal lights or other visible and/or audible indicators arranged to direct or inform a user such as a motor vehicle driver, bicyclist, pedestrian, or transit vehicle operator at or near a given traffic signal location. A common Indicator for motor vehicles is the ubiquitous Green-Yellow-Red arrangement of lights. Typically an Indicator is triggered or otherwise controlled by the FSC associated with the signal location.

Prediction. Discussed in more detail below; in general, a Controller Emulator may be implemented as part of a system to predict the future behavior of a Field Signal Controller, and more specifically, to predict the specific types and timing of a field signal controller future state change.

Phase. In a signal timing plan, for example, a Phase is "A controller timing unit associated with the control of one or more movements. The MUTCD defines a phase as the right-of-way, yellow change, and red clearance intervals in a cycle that are assigned to an independent traffic movement." So it refers to one or multiple movements that are allowed to go together under the signal control, for example, a northbound left turn can have its own (protected) phase. Or the northbound left turn can also be coupled with the northbound through (and right turn in that matter) and thus the entire northbound movements become one phase (in this case northbound left turn vehicles may have to find gaps between opposing southbound through traffic to cross the street).

Some traffic signals operate on a fixed schedule, while some others are "actuated" or may be adaptive to various conditions. Embodiments of the present invention may be used with all types of non-fixed time signals. In general, a traffic signal controller adapts to current traffic conditions and various inputs according to a predetermined signal timing plan.

Connecting vehicles to the traffic signal infrastructure is a new concept that promises to reduce fuel consumption and save time. We described herein various methods and apparatus to accomplish this functionality. The embodiments described below are not intended to limit the broader inventive concept, but merely to illustrate it with some practical implementations. The ongoing improvements in related technologies, such as cloud computing, wireless data communications, vehicle head units, video, etc. will enable further embodiments in the future that may not be apparent today, but nonetheless will be equivalent variations on our disclosure, perhaps leveraging newer technologies to improve speed, lower cost, etc. without departing from our essential inventive concept.

Some communication infrastructure is necessary to deliver various "signal data" (for example, states, timers or predictions) into a (potentially moving) vehicle in real-time. Preferably, the vehicle (or its operator) not only is informed about the current status of the signal, but also what the signal is going to do in the near-term future. Predictions of traffic control signal status and or changes can be utilized to advantage by a vehicle control system, either autonomously or with driver participation. Predictions of traffic control signal status and or changes can be utilized by a vehicle operator independently of a vehicle control system. One important aspect of the following discussion is to describe how to create traffic signal predictions and deliver them to a vehicle/driver in a timely and useful manner.

Predictions of traffic control signal status and or changes may be delivered to a vehicle in various ways, for example, using the wireless telecom network, Wi-Fi, Bluetooth or any other wireless system for data transfer. Any of the above communication means can be used for communication to a vehicle, for example, to a "head unit" or other in-vehicle system, or to a user's portable wireless device, such as a tablet computer, handheld, smart phone or the like. A user's portable device may or may not be communicatively coupled to the vehicle. for example, it is known to couple a mobile phone to a vehicle head unit for various reasons, utilizing wired or wireless connections.

Predictions of traffic control signal status and or changes may be displayed for a user on a vehicle dashboard, head unit display screen, auxiliary display unit, or the display screen of the user's portable wireless device, such as a tablet computer, handheld, smart phone or the like. As an example, a prediction that a yellow light is going to turn red in two seconds may be provided to a driver and/or to a vehicle that is approaching the subject intersection. One aspect of this disclosure is directed to the use of control emulation to generate this type of short-term prediction.

FIG. 5 is a simplified introductory diagram showing information flow 500 in some embodiments and applications of the present disclosure. Here, a traffic management center 510 may be deployed, for example, in a city, to provide centralized traffic management functions. In some cases, the traffic management center may communicate data or instructions electronically to individual signal controllers. Conversely, the traffic management center may be arranged to receive information from signal controllers around the city. The individual controllers may provide state data, which may include vehicle call data responsive to detector inputs signals. A server 512 may be configured to store and analyze data received at or provided by the TMC. The server 512 may be arranged to receive and store longer term controller data (defined later), such as vehicle call data, and to generate statistical analyses of such data, as further explained below.

Again referring to FIG. 5, the server may provide data as further described below to be used in a signal prediction feature 514. The signal prediction process in turn generates signal prediction data into a database 516. That database 516 may be made accessible to selected customers 520. For example, such customers may include automobile manufacturers, after-market automotive suppliers, etc. The prediction data in the database may then be communicated electronically to motor vehicles or their operators, also referred to as consumers 522.

Figure 6:
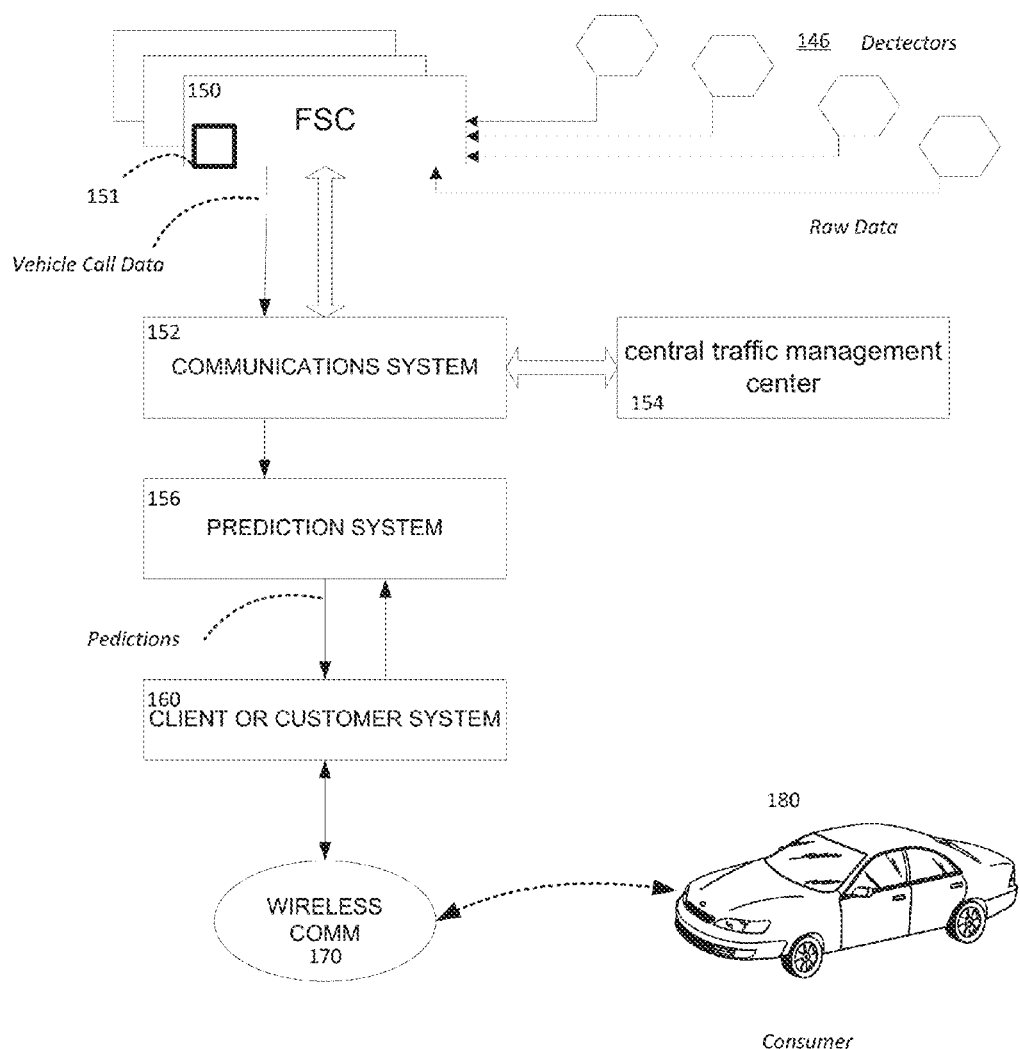
FIG. 6 is a simplified communications diagram of a traffic control prediction system.

FIG. 6 shows an alternative system in more detail. One or more detectors, referenced generally at 146, provide raw data or input signals to an FSC 150. Details of these connections are known. The FSC 150 is often coupled to a communication system 152 operated by local traffic management authorities. The authorities may operate a central traffic management center 154, although some FSC's may operate autonomously. In some embodiments, a prediction system as disclosed herein may obtain data from the central management center, as indicated in FIG. 5. In other embodiments, the prediction system may obtain data solely from the FSC. The FSC 150 receives raw data from the detectors 146 and processes that raw data to generate vehicle call data or "calls." A call may result from, for example, the detected arrival of a car 50 feet behind an intersection limit line, in a particular lane. However, we will use the terms "vehicle call" or "vehicle call data" herein in a broad, generic sense in that any given call may be responsive to any type of vehicle, pedestrian, bicycle or other input stimulus.

The vehicle call data is provided to the prediction system 156. It may be communicated via the communication system 152. Preferably, the same vehicle call data generated by the FSC is provided both to the prediction system 156 and to the central management center 154. In some embodiments, the FSC may have a wireless modem 151 installed to communicate call data wirelessly. It may receive detector data wirelessly as well. The prediction system 156, responsive to received vehicle call data and other parameters, generates predictions of FSC state changes, which may include indicator state changes. The predictions may be communicated to a client or customer 160. For example, the client may be an automobile manufacturer, or an aftermarket product or service vendor. The predictions may be conveyed to the client 160 using a push protocol, a pull protocol, regularly scheduled updates or other variations which, in general, should be arranged to be reasonably timely. In a presently preferred embodiment, a push message is executed once per second. In some embodiments, the client 160 may communicate predictions, or information based on the predictions, via a wireless communication system or network 170, to its customers or consumers 180, typically in a motor vehicle.

The prediction system 156 in some embodiments may correspond to the prediction system 100 explained in more detail with regard to FIG. 1.

FIG. 1 is a simplified conceptual diagram of an example of a traffic control prediction system 100. The system comprises a control emulation component or system 102, which may include control logic 110 and local control parameters 112. The local control parameters match those of the actual FSC of interest. The local control parameters may include, for example, timing parameters, cycle time, etc.

In this illustration, the prediction system 100 receives current signal status (observed) as input data 120. The current signal status (real time) may be communicated from the FSC using known protocols. The signal status preferably includes state information and current vehicle call data. The prediction system also receives past signal status (collected) as input data 122. Past signal status data may be collected and processed off-line. For example, such data may be accumulated over several days or weeks. This data may be stored in a database for statistical analysis as further described below.

The prediction system 100 also receives future vehicle call data (Predicted) as input data 140. The future (predicted) detection data 140 is used to advance the control emulator, while applying the local control parameters, to a new state that reflects what the actual controller state is likely to become in the near future. As discussed below, the emulator can be clocked at a rate faster than real-world time, so that it "gets ahead" of the current state of the actual FSC being emulated. The results of the emulation may comprise a future signal status (predicted signal status), indicated as output data 130. The predicted signal status may be communicated to a vehicle or a vehicle operator, or other user, as further described below.

Figure 2A:
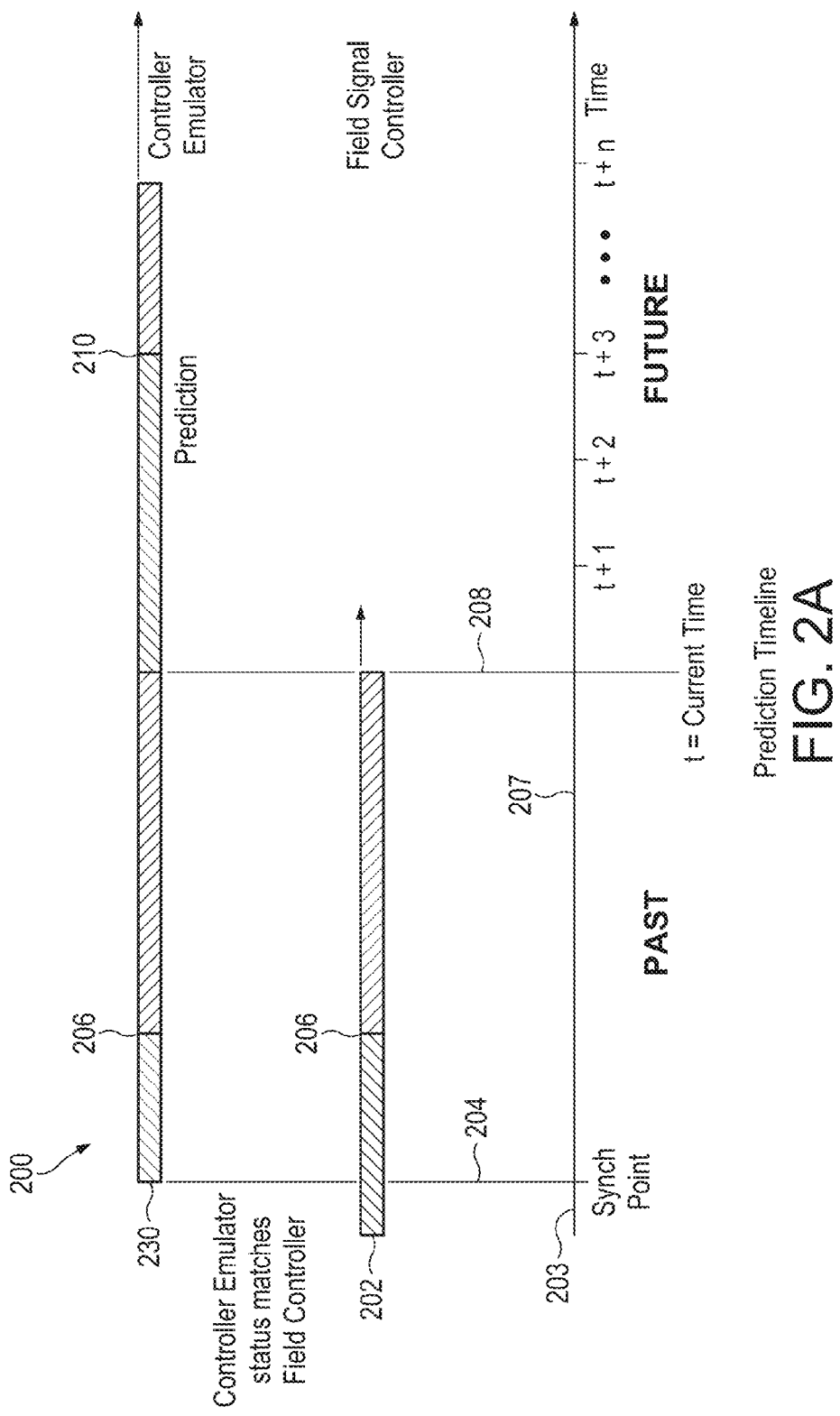
FIG. 2A is a simplified timing diagram illustrating synchronization of a controller emulator process to a field signal controller.

FIG. 2A is a simplified timing diagram illustrating the pertinent timing relationships in greater detail. In the timeline, time is indicated along the bottom axis 203, moving from the past on the left to the future on the right. The actual (real world) current time =t is indicated at vertical line 208. A first bar 202 represents time in the field signal controller, as for example, may be maintained by a local system clock. A second bar 230 represents "time" in the controller emulator (or emulation process).

One challenge presented is to synchronize a state of the controller emulator to the current state of the actual FSC. The difficulty arises because the FSC continues to run, and change state, continuously. It is not practical, and potentially even dangerous, to stop the FSC in order and capture a current state. In order to synchronize state to this "moving target," a process may proceed as follows. First, actual FSC data is collected during a period 203 that is before the point in time marked "Sync Point" 204. An emulator process is initialized to that "old" FSC status to begin. Then, at the sync point in time 204, at least one emulator process is started, and it runs forward from the sync point, up to the current time t and beyond. The emulator "catches up" to the current real-world time t by clocking it at a faster rate. During this time period 207, the emulator process receives call data provided by the FSC responsive to detector inputs or the like. Consequently, the emulator will clock through the same state changes as the actual FSC during this period, up to the current time (t) at 208. Thus the emulator is now fully synchronized to the FSC, at the actual current time.

Starting from the current time t, it remains to predict what the FSC will do in the future. The units are not critical, but intervals of one second are convenient in a presently preferred embodiment. In order to drive the emulator to an expected future state, say a time t+1 or t+3 in FIG. 2, the emulator receives "future detection data" indicated as 140 in FIG. 1. The future detection data may be generated, for example, by a statistical or probability analysis of actual detection data received at the subject FSC in the past. Again, the controller emulator is running in "fast forward" mode.

To simplify, here we discuss only a single detector for illustration. For example, one detector might be an in-ground induction loop that detects the presence of a car. Or, it might be a pedestrian push-button. The raw input signals from the detector are received by the FSC and converted into vehicle call data as noted. That call data may be collected and stored over a data collection period, say two weeks, and analyzed using known statistical analyses. The goal is to analyze past behavior of the FSC to help predict its likely future behavior. The data collection period may vary depending on circumstances, and may be changed to optimize it for a given application. The analysis may show, for example, that there is a 40% likelihood of a given call after 2 seconds; and a 60% likelihood of receiving that call after 3 seconds; and perhaps a 90% likelihood or receiving that call after 4 seconds. Each emulator may be calibrated as to how best use this data. For example, the 60% likelihood may be deemed sufficient to trigger a predicted call at t+3. In another application, it may wait until t+4 when the likelihood is greater. Assuming the predicted (and simulated) call is input to the emulator at time t+3, it will change state accordingly. Assuming no other inputs for simplicity of illustration, the emulator now reflects a state that the real FSC is likely to reflect in the future, namely at time t+3. Thus a prediction at 210 is completed. The prediction is captured and the emulator instance may be terminated.

Figure 2B:
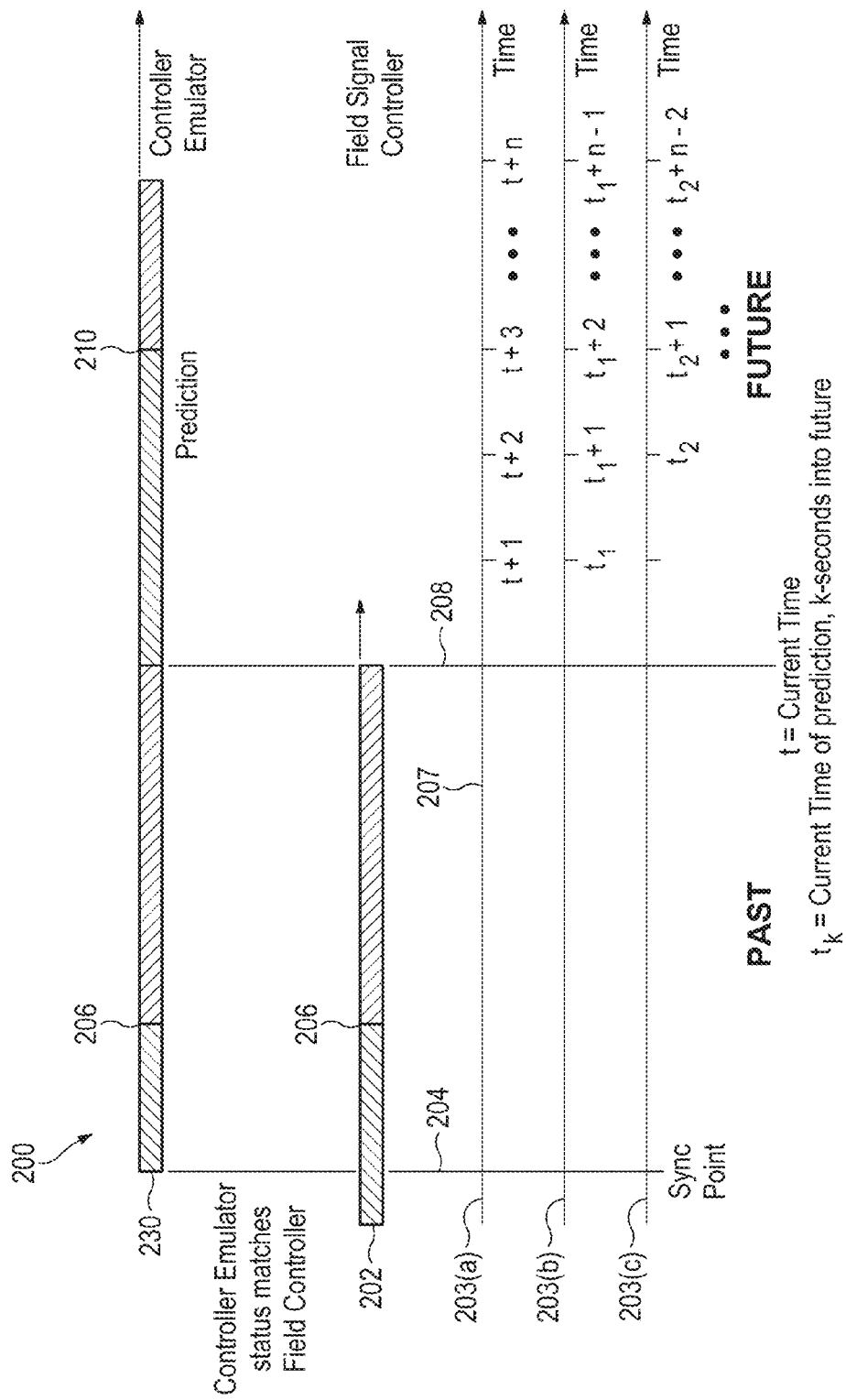
FIG. 2B is an augmented version of FIG. 2A illustrating a series of staged future predictions.

FIG. 2B is an augmented version of FIG. 2A illustrating a series of staged future predictions. In this embodiment, after completing a prediction, the results are stored in a buffer or queue to be available for communication to the client. Obtaining the live statuses from an FSC takes time, as does running the emulator. In order to deliver predictions with minimal lag attributed to such tasks, multiple predictions can be made in each emulation step. For example, assume a prediction is made that an indicator light will change from red to green 3 seconds into the future, as indicated at mark 210. In the same emulation step, we would find that barring unforeseen changes to the live system, 1 second into the future, the emulator would predict a change to occur in 2 s. In 2 seconds into the future, the emulator would predict a change in 1 s. Delivering all three of these predictions to the buffer or queue will result in multiple predictions with respect to the same time, t, even before we reach that time, t, by the emulator. Thus, if there is lag when obtaining the signal statuses and/or performing the emulation, it can be absorbed by the most recent prediction along one of the future tracks (203(*b*), 203(*c*), etc) which pertains to the same base time, t. These results may be more reliable than alternatives, such as automatic time corrections, because the corrections can be derived using the same emulator as the predictions themselves.

Figure 3:
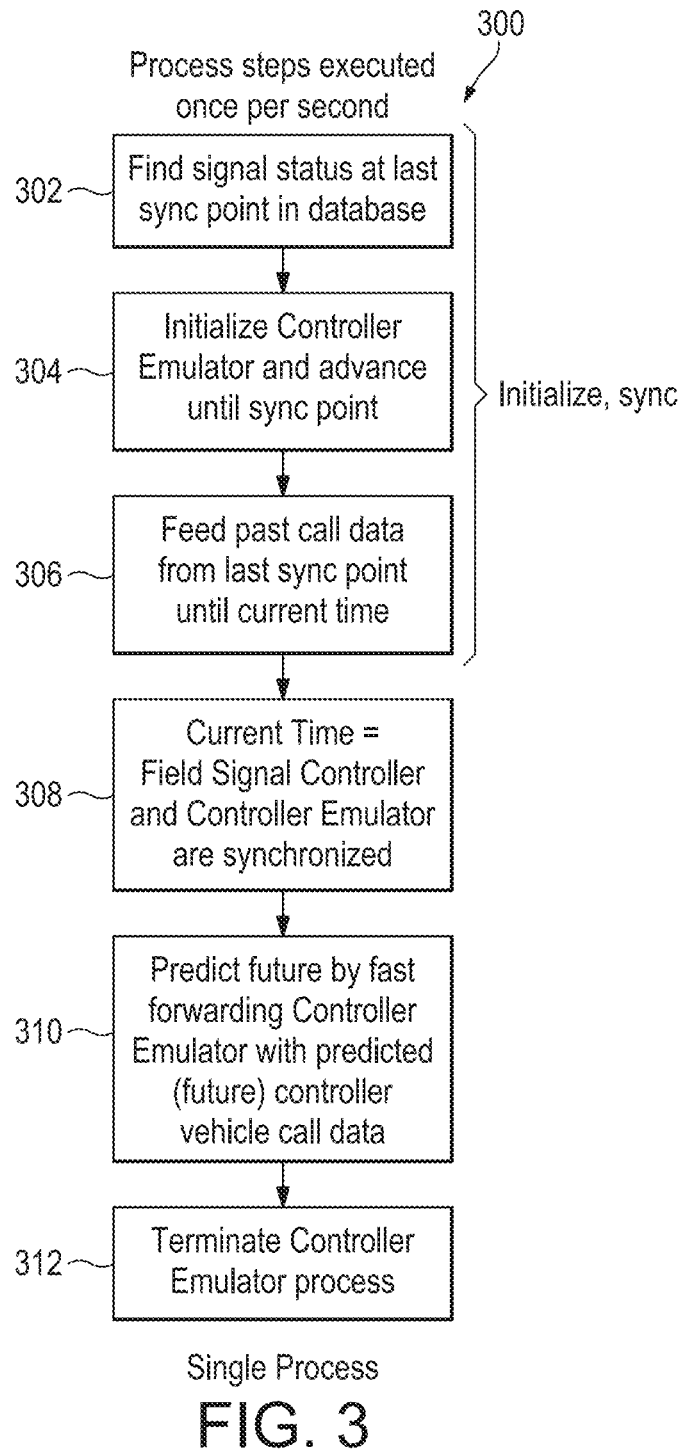
FIG. 3 is a simplified flow diagram illustrating a process for short-term signal status prediction based on a control emulation process.

FIG. 3 is a simplified flow diagram illustrating one emulation method 300 of the type described above, utilizing a single emulator process. Here, we use the term "process" to refer to a computer software process, thread, or the like. In a preferred embodiment, the following process steps may be executed once per second. At block 302, the method calls for finding signal status at a last sync point in a database. At block 304, a controller emulator is initialized and advanced to that last sync point. And at block 306, the method calls for feeding past call data into the emulation, from the last sync point, until the current time t. As noted with regard to FIG. 2, at this time t the emulator is synchronized to the subject FSC, as noted in block 308.

At block 310, the likely future FSC behavior is predicted by fast forwarding the controller emulator, using predicted (future) detection data. The predicted state change may be saved and/or exported, as noted above. At block 312, we terminate the controller emulator process. In some embodiments, the same emulator process may then be re-initialized and run again, in the same fashion as above. Or a new instance may be spawned. On the next operation, and each subsequent run, the process is re-initialized to a more recent sync point.

Figure 7:
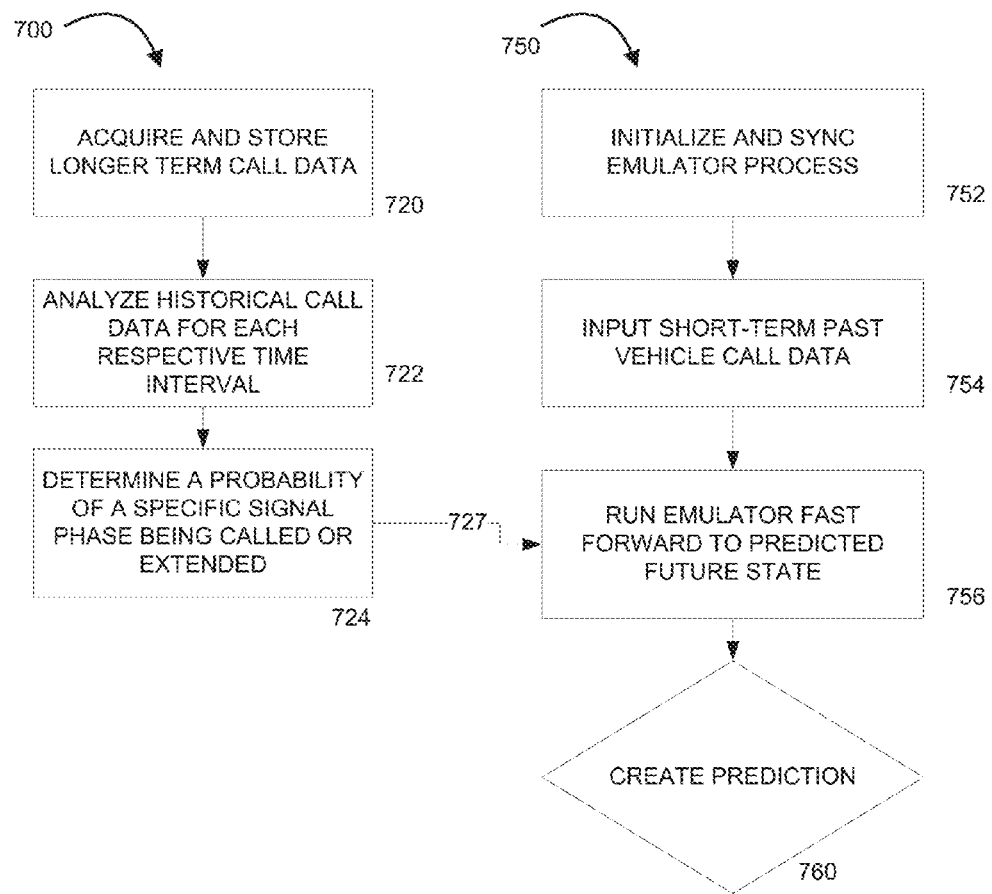
FIG. 7 is a simplified flow diagram illustrating a process for traffic signal predictions utilizing a combination of statistical analysis of historical signal call data, combined with emulation process results.

FIG. 7 is another simplified flow diagram illustrating a process for traffic signal predictions utilizing a combination of statistical analysis of historical signal call data, combined with emulation process results. On the left side of diagram indicated at 700, block 720, we acquire and store longer term signal call data. "Longer term" here refers to multiple days, typically, or even several weeks. These magnitudes of time, and preferably two weeks, have been found suitable for some applications. Next, block 722, the historical data is analyzed for selected time intervals. The time intervals may be for example, 15 minutes, or an hour or two, or a day, or a number of cycle times. The statistical analyses may also include variables for time of day, calendar date, time of year, holidays, etc. The process may determine, at block 724, a probability of a specific signal phase being called or extended. In some embodiments, historical analysis may be done offline, or in a process or processor separate from the controller emulator process.

An emulator process may be initialized and synchronized, block 752. For example, an emulator process may be synchronized to a sync point as discussed. Next, current vehicle call data may be input to the emulator process, block 754. For example, "short-term past" may correspond to the time period 207 in FIG. 2A, between a sync point and the current time t. The emulator is run "fast forward" block 756 and during that time it receives and processes both the actual call data 754 and the predicted call data via path 727 from process block 724. The emulator creates 760 a prediction of what state change will occur in a corresponding field signal controller, and when.

In some embodiments, a method may include repeating the foregoing steps at a rate of once per second, so as to enable updating the predicted signal status once per second. In some embodiments, field detection data may be received as signal phase data for input to the emulator. In some embodiments, the current state of the emulator includes indicator phase displays (e.g., red, yellow, green, walk, flashing don't walk), and active timers (e.g., minimum green, yellow clearance, red clearance, pedestrian walk, pedestrian clearance, etc.)

The predicted signal status may be forwarded or communicated to a vehicle/driver who may be approaching the subject traffic signal. In an embodiment, a motor vehicle may be equipped with suitable equipment to receive that prediction data, and convey it to a control system and/or a passenger or driver of the vehicle. In one embodiment, prediction data may be displayed on the dashboard; in another embodiment it may be displayed on a head unit or navigation unit display screen. The "navigation unit" may be standalone, or implemented as an "app" on a mobile device.

Figure 9:
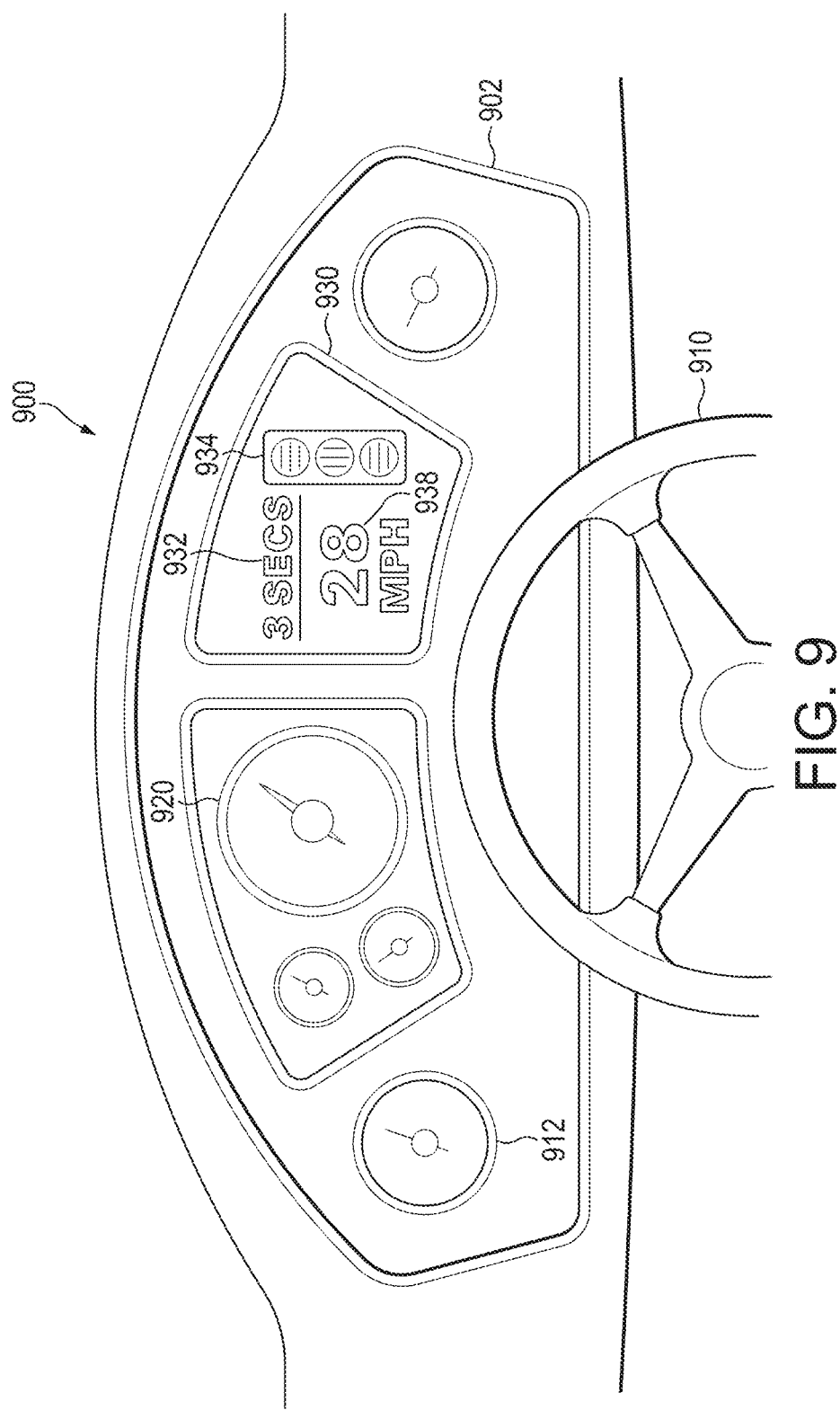
FIG. 9 shows an example of a traffic signal prediction display in a vehicle dashboard.

FIG. 9 shows an example of a traffic signal prediction display (930) in a vehicle dashboard. In FIG. 9, a vehicle dashboard is indicated generally at 900. Dashboard 900 may include an instrument panel 902, comprising various gauges or instruments 912, and typically a speedometer 920. A steering wheel 910 is shown (in part) for context. A traffic signal prediction display 930 in this example may comprise a time display 932 ("3 SECS") and a signal display 934. For example, the signal display 934 may comprise three light indicators. They may be red, yellow and green, and they may be arranged like the signal lights in a typical intersection traffic control signal.

It is not critical, however, that the light indicators be arranged in that manner, or that colored lights are used at all. Various visual display arrangements other than this example may be used; and indeed, audible signaling (not shown) may be used as an alternative, or in addition to, a visual display. The essential feature is to convey some traffic signal prediction information to a user. For example, in FIG. 9, the time display 932 may indicate a number of seconds remaining until the traffic signal that the vehicle is approaching is expected to change state, say from yellow to red. In some embodiments, the traffic signal prediction display 930 may include a speed indicator 938 ("28 MPH"). This may be used to indicate a speed calculated for the vehicle to reach the next signal while it is in the green state.

Having knowledge of what an upcoming traffic signal is going to do in the near future can be used to save gas, save time, and reduce driver stress. For example, when the wait at a red light is going to be relatively long, the driver or an on-board control system may turn off the engine to save fuel. And the prediction system will alert the driver in advance of the light changing to green, to enable a timely restart of the engine. Or, a driver or control system may adjust speed to arrive at a green light. Travel time may be saved by routing optimizations that are responsive to anticipated traffic signal delays. Toward that end, the database prediction data may be provided to a mapping application. Stress is reduced as a driver need not continuously stare at a red signal light, waiting for it to change. In fact, if the wait is known to be long, the driver may want to check her email or safely send a message.

Alternative Embodiments

Instead of using only one emulation process to do the prediction, in another embodiment we use one separate process for each cycle second. That way, we don't have to go back in time to the sync point to resynchronize the emulator before being able to play forward every time step. Instead, in one embodiment, we start up as many emulation processes as there are cycle seconds at the synch point. We keep them all synchronized every time step, and then use one of them to play forward and predict for every time step as we move through the cycle second (after which we discard the process). This approach significantly reduces the computation and real-time data storage burdens as we no longer have to keep track of vehicle call data in real-time between sync point and current time. Instead, we have many more, but less computing-intense processes, which is preferable for a cloud computing environment.

FIG. 4 is a simplified flow diagram of an alternative process 400 for short-term signal status prediction, utilizing a plurality of control emulation processes. Process steps may be executed periodically, for example, once per second, although this interval is not critical. A first controller emulator (or controller emulator process) 420-1 is synchronized to the field controller, block 410, thereby establishing an initial "Current Time." Similarly, a second controller emulator 420-2 also is synchronized to the field controller, so that the second emulator also is synchronized to the "Current Time." In like manner, additional controller emulator processes may be synchronized to the same Current Time, as indicated by 420-N. After all relevant emulator processes have been initialized and synchronized, all of them commence execution responsive a common clock signal, and thereby remain synchronized.

Subsequently, at block 432, we "fast forward" all of the controller emulator instances to predict future control signal state changes, using predicted (future) call data. Each emulator instance may be terminated at a selected time "in the future." For example, in FIG. 2A, a prediction is concluded at a future time "t+3" indicated at 210. That emulator instance is then terminated, block 440. However, the remaining instances continue to run, as explained with regard to FIG. 8.

Figure 8:
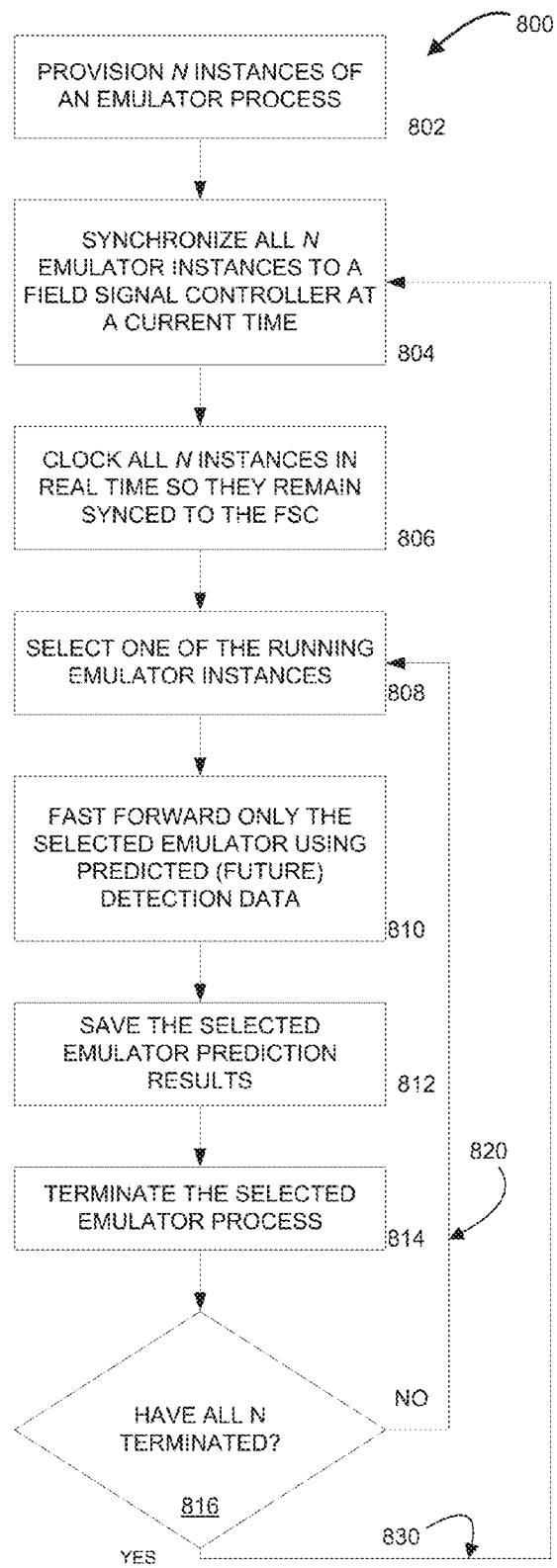
FIG. 8 is a simplified flow diagram of an alternative emulation process that utilizes a plurality of emulator instances, all advancing from a common synchronization state.

FIG. 8 provides a simplified flow diagram 800 of a multiple-emulator embodiment. Preferably each emulator may be an instance of suitable code. At block 802 we provision N instances of an emulator process, where N is an integer on the order of approximately 10-40, although this number is not critical. At block 804, all N instances are synchronized to the same field signal controller at a current time. Methods for doing so are described above. Next, at block 806, we clock all N instances in real time, so that all of them remain actually synchronized to the field signal controller. To remain fully synchronized, the instances also receive real-time detector calls; the same inputs as provided to the FSC.

Next, at block 808, the system selects one of the running emulator instances, and then, block 810, "fast forwards" only the one selected instance, typically by applying a faster clock than the real-time clock. During the fast forward process, predicted future detection data is input to the instance, as discussed above. In one embodiment, the selected instance performs this prediction over a one-second interval.

At the end of that prediction, block 812, the system saves the selected emulator prediction results. For a first selected emulator, this would provide t+1 second prediction results. Then the selected emulator process (only one) is terminated, block 814. Note that meanwhile the other N−1 instances have continued, under real-time clocking, to remain synchronized to the field signal controller, so they are ready to go "fast forward" from their current state. Decision 816 determines whether all N instances have terminated. If not, the process continues via path 820 back to block 808, and selects a second one of the remaining emulators. The second selected emulator instance, only, is then "fast forwarded" as described above with regard to block 810 and the process continues as before using the second selected emulator instance to perform a second prediction. The second prediction may be for time t+2. This same loop 820 is then repeated again for each of the remaining N−2 instances, so that each instance provides a prediction at a time in the future. So, for example, 50 instances might be provisioned to predict signal changes 50 seconds into the future.

Decision 816 detects when all N instances have terminated. The process then loops via path 830 back to block 804 whereupon all N instances are synchronized anew to the new current time t. The process continues to repeat as described so as to continually provide predictions of field controller state.

Hybrid Distributed Prediction

There are various ways to communication current traffic signal status to a vehicle. One of them is DSRC—explained in detail below. The DSRC system, when deployed in connection with a traffic signal, broadcasts a current signal status (RYG) in real-time to all nearby vehicles or other entities equipped to receive it. In locations where DSRC is deployed, we can take advantage of that information, which has negligible latency, and marry it the prediction methodologies described above. Real-time signal status can be used advantageously to update or synchronize a prediction process, avoiding the uncertain latency of data flow from a signal controller, and/or local traffic management center, to a central prediction system, such as illustrated in FIG. 6. DSRC however, is not yet widely available.

As an alternative, or to supplement DSRC, newer vehicles, especially autonomous vehicles, have cameras built in, and an on-board camera can be used to recognize a current state of a traffic signal as the vehicle approaches the signal. Here, the "state" of a signal refers to RYG status. The camera captures the signal status in real-time. Accordingly, where camera/image data is available in the vehicle, that data source can be used to advantage to update or synchronize a prediction process, again avoiding latency issues. The image data can be acquired on an internal vehicle data bus through a suitable interface using known technologies.

In some embodiments, some of the functionality described above may be moved on-board a vehicle. That is, on-board computing resources in a vehicle can be used to provide or assist in the prediction process. Computing resources may be provided as part of a standard vehicle configuration, or they may be modified or added in some vehicle configurations. Computing resources may be added in the form of after-market products. In other scenarios, computing resources may be provided by a portable, hand carried device such as a smart phone. The smart phone may be communicatively coupled to vehicle systems or networks, for example, via a head unit or navigation system. Such coupling may be by cable or short-range wireless connection. Any combination of standard or custom resources may be used within the scope of this disclosure. As modern vehicles, including hybrid and pure electric vehicles evolve, they increasingly contain multiple networks, processors and other computer-type resources such as user interface devices (display screens, joysticks, voice input, etc.). In some vehicle environments, relatively few changes will be needed to implement embodiments of this disclosure. In some vehicles, only software changes may be needed.

On-board prediction results can be used in various ways. Some examples include (1) display of prediction information in the vehicle; (2) transmission of the information to the back-end server; (3) transmission in the vehicle to an on-board an autonomous vehicle control system for use in autonomous operation of the vehicle; (4) transmission over short-range communications to a portable device in the vehicle. Display of prediction results, for example, the expected time remaining to a specified state change (say yellow to red, or red to green) for a signal in front of the vehicle, may be done on a dashboard display (See FIG. 9 for example), or in a "head unit" or navigation system display screen, a windshield "heads up" display, a wearable display, etc. These examples are illustrative and not intended to be limiting. Further, in some embodiments, the prediction results may be provided in audible form. For example, an audio message about upcoming signal changes may be played over the vehicle audio or entertainment system, a smartphone speaker, etc.

Figure 10:
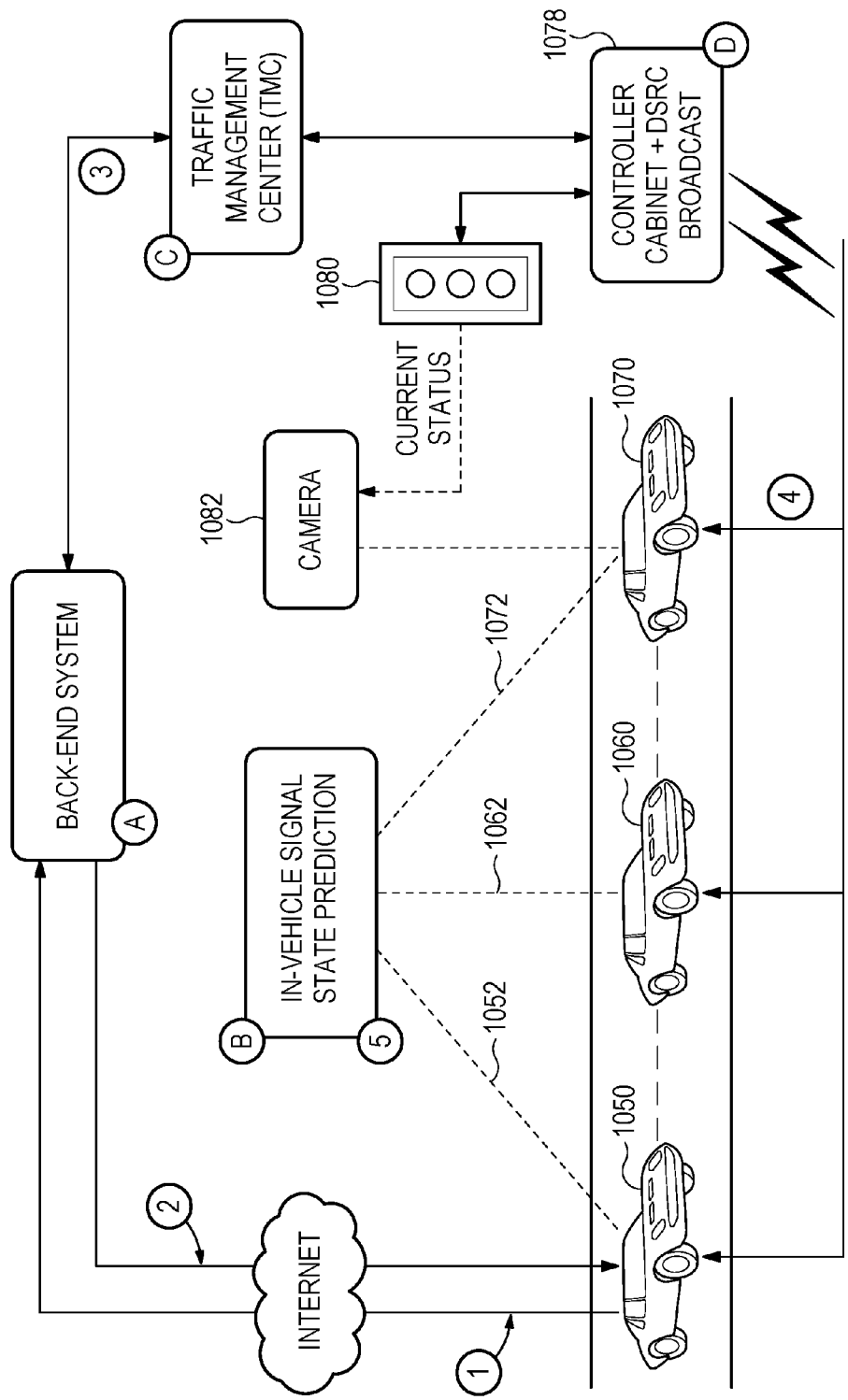
FIG. 10 is a simplified communication diagram illustrating operation of some systems and methods for traffic signal prediction in a vehicle in near real-time.

Turning to FIG. 10, it illustrates an example of an embodiment, in a simplified workflow/system diagram. First we introduce the primary components in this system. In this example, a Back-end System A may be a "lean" version of a prediction system such as that described above. System A preferably is configured to maintain (or have access to) signal timing plans. Timing plans are individualized for each traffic signal. They may include sequences of state changes (for example, green-yellow-red), and a maximum duration for each state and other localized settings. System A may include or have access to a data store of individual signal timing plans for a given geographic area. System A is also configured to compile prediction parameters. For example, this system may generate likely or expected future detection data for a given FSC based on a statistical analysis of a collection of long-term past field detection data acquired from the corresponding FSC. The backend system A is not intended to be located on board a vehicle. Typically, it may be installed at a fixed location or "in the cloud." In some embodiments, it could be portable. System A includes network communications capability to send and receive data over a network, for example, the internet or wireless telecom.

In more detail, in some embodiments, the backend system may have accumulated 1 month of data (vehicle arrivals, vehicle presence, in combination with the signal status) from the TMC via communication path "3." This one-month time period is not critical. The backend system statistics processing module will calculate the following:

Compute the total number of cycles, N

For each cycle, get the green duration for each of the phases, and compute the observed maximum durations for green signal duration, MAX_g_obs For each second in [0, MAX_g_obs] in each phase:

a. Compute the occurrence of the vehicle arrival/presence b. Compute the empirical probability p for vehicle arrival/presence c. Store p to a backend system database, and form the statistics dataset P.

This task is performed periodically on the backend system, for example, in the cloud. This statistics database dataset P will then be transferred to the in-vehicle computer at request of the approaching vehicle, as the data support to the prediction system.

Again in FIG. 10, a system "B" represents a signal state prediction system deployed on board a vehicle, for example, a car, bus, etc. System B preferably is implemented mainly in software. The prediction system may be executable on computing resources in the vehicle as described above. System A is configured to send vehicle calls and prediction parameters to each system B. for example, system A may have an assigned geographic area, and it may send data to vehicles in its operating area. In FIG. 10, three vehicles 1050, 1060 and 1070 are shown for illustration. In each vehicle there is an in-vehicle signal state prediction system B, as indicated by dashed lines 1052, 1062 and 1072, respectively. System B is not distributed; rather, there is a corresponding one of them in each vehicle. In each vehicle, the system B requests and receives data from the back-end system A, for example, via the internet or other wireless communications means. System B utilizes the data to perform predictions on board the vehicle. An example of a prediction process is described in detail above, particularly with regard to FIGS. 3 and 7. However, other prediction methods may be used in system B. System B also is coupled by appropriate interfaces for interaction with systems, networks or other resources on-board the vehicle.

Referring again to FIG. 10, system C is a traffic management center ("TMC"). This represents a facility where local or regional authorities typically attend to monitoring and controlling traffic flow, including in some cases vehicular, transit and other types of traffic. In an embodiment, the system C is arranged to collect signal status data and send that data to the backend system A over a communication link 3. The TMC typically is also arranged to collect vehicle call data (typically generated by sensors, not shown), from signal controllers 1078, also labeled D in the drawing. Currently, the vehicle call data are not part of the data dictionary for DSRC communications. In the future, vehicle call data and other traffic flow related data may become part of the data dictionary; in this case, vehicle call data can also be transmitted directly to the in-vehicle prediction system and thus eliminate the latencies introduced via link 3. Each intersection or traffic signal 1080 may have a corresponding controller 1078. Data collected by the TMC and forwarded to the system A is subject to latencies that may be variable and not well-defined. Additional latencies may be encountered in communications between the system A and the vehicle system B.

The traffic controllers labeled D in the drawing may implement a wireless, short-range broadcast system to send current signal states with minimal latency to nearby vehicles. In some embodiments, the controller may implement "DSRC"—Dedicated Short-Range Communications system, a system specifically designed for automotive use and a corresponding set of protocols and standards. Other short-range wireless protocols include IEEE 802.11, Bluetooth and CALM. In October 1999, the United States Federal Communications Commission (FCC) allocated 75 MHz of spectrum in the 5.9 GHz band to be used by intelligent transportation systems (ITS). In August 2008, the European Telecommunications Standards Institute (ETSI) allocated 30 MHz of spectrum in the 5.9 GHz band for ITS, By 2003, it was used in Europe and Japan in electronic toll collection. DSRC systems in Europe, Japan and U.S. are not compatible and include some very significant variations (5.8 GHz, 5.9 GHz or even infrared, different baud rates, and different protocols). More details can be found at https://en.wikipedia.org/wiki/Dedicated short-range communications. In FIG. 10, the DSRC broadcasts are illustrated by the arrows at number 4. As noted, alternatively or in addition, the vehicle, say 1070, may have a camera 1082 on board that is configured to capture signal status (by taking a picture or video of a traffic signal in its view). The captured image or corresponding image data, or a simplified result based on the image, for example, "the signal is RED," is provided to the system B, for example, over an on-board network.

In operation, again referring to FIG. 10, a vehicle 1070 is approaching a traffic signal 1080, which may be called the "target signal." The prediction system B in the car sends a request "1" to the back-end system A, for example, via the internet, for information about the target signal. The request message preferably includes an identifier of the target signal or its location. One way to determine its location is via GPS. Another way to identify the target signal is to receive its DSRC broadcast. In response to the request, the back-end system sends data via path "2" comprising prediction system inputs for the target signal. In some embodiment the back-end system may send the following statistics: At start of signal switch, depending on the switch type (red to green, or green to red), the probability of vehicle arrivals or presence for each second till the end of the maximum. The back-end system may send the statistics database dataset P described above. The back-end system develops these statistics over time by accumulating data via path "3" from the TMC or an equivalent source. With this information the system B can predict likely upcoming changes at the target signal. The system B may emulate the target signal controller D operation, utilizing the statistical inputs as expected sensor call data.

The prediction can be improved, however, with real-time target signal state information. That is, the prediction process can be adjusted or synchronized to the actual current signal status if known in real time. As explained above, this can be acquired by a DSRC system broadcast from the target signal, and/or utilizing on-board camera 1082 image data. With that information, the prediction system can instantly change state to match the current actual state of the target signal, and the problems of latency are overcome.

Figure 11:
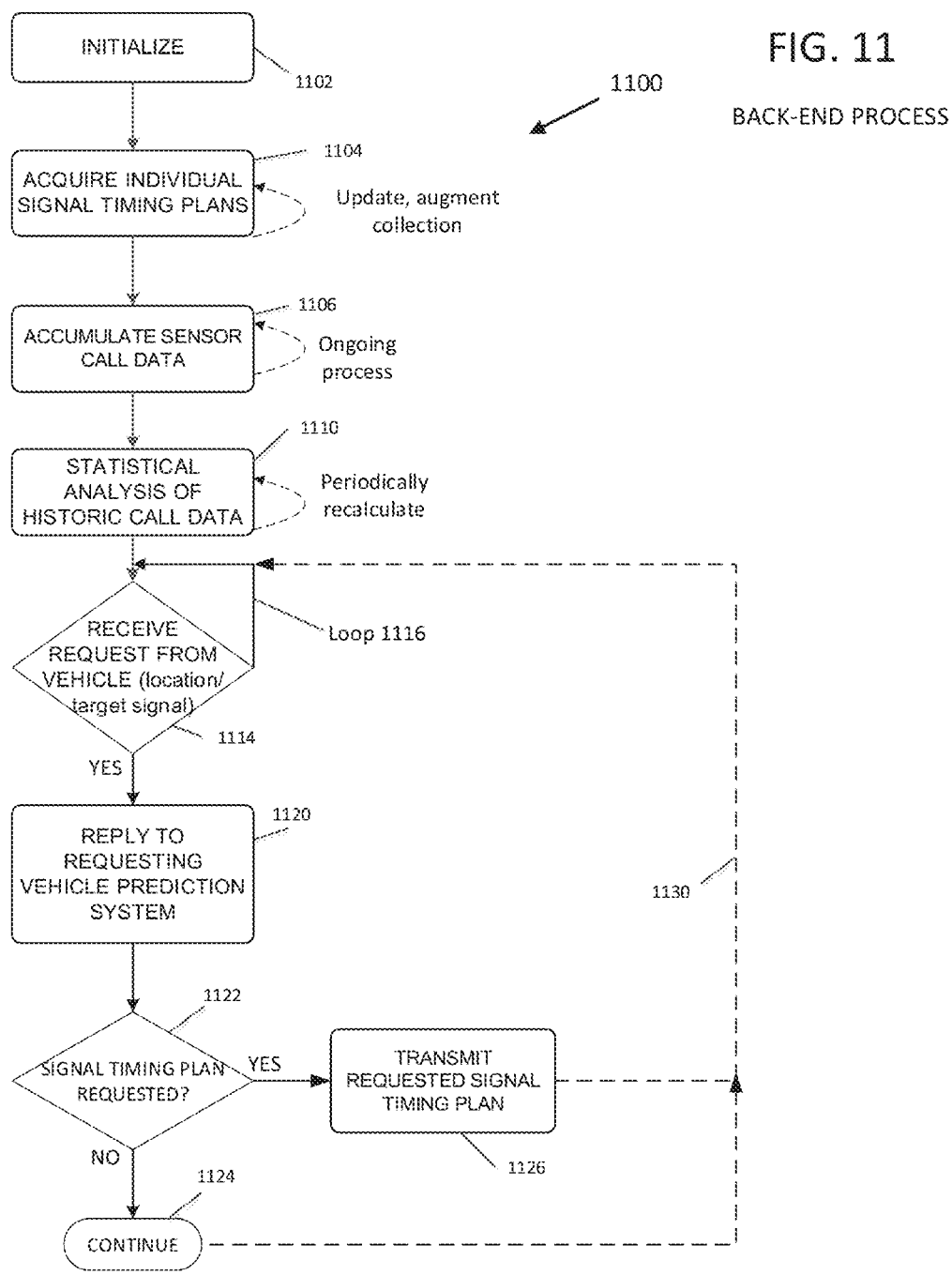
FIG. 11 is a simplified flow diagram of a process that may be carried out by suitable software in a back-end server system, to support signal state predictions and the like in vehicles that are in use.

FIG. 11 is a simplified flow diagram of an example of a process that may be carried out by suitable software in a back-end server system, to support signal state predictions and the like in vehicles that are in use. In FIG. 11, the back-end process is initialized, block 1102. It may acquire individual signal timing plans, block 1104, as noted above. This process 1104 may be repeated to update or augment a collection of timing plans. In some other embodiments, the back-end system may not acquire signal timing plans at all; rather, that may be left to the on-board vehicle systems. They may, for example, continuously acquire local signal timing plans as they travel.

The process calls for accumulating sensor call data, block 1106; this is ongoing or periodically repeated over time. In an embodiment, the data may be collected from a TMC illustrated in FIG. 10. The back-end process further calculates statistical analyses of the accumulated data, block 1110, as described in more detail above. The process steps in FIG. 11 need not be carried out in the order shown. Further, some of them may be concurrent processes. The process further calls for monitoring for communications from vehicles, decision 1114. This should be done more or less continuously, see loop 1116. If and when a request message is received from a vehicle (YES branch), the system assembles a reply message, and communicates it to the requesting vehicle, block 1120. Representative examples of data included in a reply were described above. In some embodiments where signal timing plans are provided by the back-end system, a request from a vehicle may include a request for a target signal timing plan, decision 1122. A request for a timing plan may be included in, or separate from, a request for prediction statistical data. If requested, the timing plan may be transmitted, block 1126, to the requesting vehicle prediction system. If not, the process continues at 1124 and loops back via path 1130 to continue monitoring for request messages. A single back-end system may execute numerous instances of these processes, or numerous threads, to service requests from numerous vehicles substantially simultaneously. Conveniently, resources may be provisioned in the cloud as necessary to particular applications.

One of skill in the art will recognize that the concepts taught herein can be tailored to a particular application in many other ways. In particular, those skilled in the art will recognize that the illustrated examples are but one of many alternative implementations that will become apparent upon reading this disclosure. It will be obvious to those having skill in the art that many changes may be made to the details of the above-described embodiments without departing from the underlying principles of the invention.

The scope of the present invention should, therefore, be determined only by the following claims.

The invention claimed is:

1. An apparatus for use in a vehicle for traffic signal predictions, comprising:

a processor coupled to a memory to execute non-transient, machine-readable instructions stored in the memory;

a first interface coupled to the processor for wireless data communications over a network with a remote back-end server;

a receiver coupled to the processor to receive a current state of a target traffic signal;

the stored instructions configured to:

implement a signal state prediction process;

when the vehicle is approaching or near a traffic signal, send a request message via the first interface to the remote back-end server, the request message including information to identify the traffic signal as a target traffic signal;

receive a reply message from the remote back-end server, the reply message including statistical data based on historical operation of the target traffic signal, wherein the back-end server generates the statistical data by acquiring call data and signal status data provided by a field traffic signal controller (FSC) associated with the target traffic signal during a selected collection period, and storing the acquired call data in a database coupled to the-remote-back-end server;

input the statistical data to the signal state prediction process;

commence executing the signal state prediction process wherein executing the signal state prediction process includes:

identifying a signal status at a last sync point of the FSC, initializing the signal state prediction process to an initial state, advancing the signal state prediction process from the initial state to a second state, the second state corresponding to the last sync point of the FSC, and further advancing the signal state prediction process from the second state, based on the statistical data in the reply message, for a time period from the last sync point to a current time state so that at the current time the FSC and the signal state prediction process running in the vehicle are synchronized to the current time state;

receive the current state of the target traffic signal via the receiver;

in the signal state prediction process, update a state of the target traffic signal to match the current state of the target traffic signal;

in the signal state prediction process, generate a prediction of a next state change of the target traffic signal in the future, by:

fast forwarding the signal state prediction process from the current time state, based on the received statistical data, terminating the signal state prediction process at a future time state, and generating a prediction of future signal status of the target traffic signal based on the future time state of the emulator;

and then transmit the generated prediction to an on-board network in the vehicle for display in the vehicle or input to engine control units or other on-board computers for use in controlling operation of the vehicle.

2. The apparatus of claim 1 including an electronic display in the vehicle, wherein the electronic display is coupled to the on-board network to display information based on the prediction.

3. The apparatus of claim 1 wherein the receiver is configured to receive a short-range broadcast message from a traffic signal controller, the broadcast message indicating a current state of a traffic signal operatively coupled to the traffic signal controller.

4. The apparatus of claim 3 wherein the short-range broadcast message comprises a Dedicated Short-Range Communications system (DSRC) compliant message.

5. The apparatus of claim 1 wherein the receiver is configured to receive image data from a camera in the vehicle and to determine the current state of a traffic signal in front of the vehicle based on the acquired image data.

6. The apparatus of claim 5 wherein the camera is built into the vehicle.

7. The apparatus of claim 1 wherein the receiver is configured to receive image data from a camera in the vehicle and to determine a current state of a traffic signal head in view of the camera based on the acquired image data.

8. A vehicle comprising:
a processor coupled to a memory to execute non-transient, machine-readable instructions stored in the memory, the stored instructions including instructions to implement a signal state prediction process;
a first interface coupled to the processor for wireless data communications over a network with a remote back-end server;
a camera coupled to the processor for capturing image data including an image of a target traffic signal located in front of the vehicle;
the stored instructions configured to;
when the vehicle is approaching or near a traffic signal, send a request message via the first interface to the remote back-end server, the request message including information to identify the traffic signal as a target traffic signal;
receive a reply message from the remote back-end server, the reply message including statistical data based on historical operation of the target traffic signal;
input the statistical data to the signal state prediction process;
begin executing the signal state prediction process, starting at a last sync point for the target traffic signal, and informed by the statistical data, advance the signal state prediction process to catch up to a current real-world time by clocking it at a clock rate faster than real world time, so that at the current time a field traffic signal controller (FSC) associated with the target traffic signal and the signal state prediction process running in the vehicle are synchronized to the same state;
process image data captured by the camera to determine a current state of the target traffic signal;
input the current state of the target traffic signal to the signal state prediction process;
in the signal state prediction process, update a state of the target traffic signal to match the current state of the target traffic signal;
in the signal state prediction process, generate a prediction of a next state change of the target traffic signal in the future, by:
fast forwarding the signal state prediction process from the current state, by clocking the signal state prediction process at a clock rate faster than real-world time, and then terminating the signal state prediction process at a selected future time state, and
generating a prediction of a future state of the target traffic signal based on the future time state of the signal state prediction process; and transmit the prediction to an on-board network for display in the vehicle or input to engine control units or other on-board computers for use in controlling operation of the vehicle.

9. The vehicle of claim 8 wherein the stored instructions are further configured to:
generate a warning message based on the prediction; and
transmit the warning message for display in the vehicle.

10. The vehicle of claim 8 wherein the stored instructions are further configured to:
generate an audio warning message based on the prediction; and
transmit the audio warning message to be played over an audio output in the vehicle.

11. The vehicle of claim 8 wherein the stored instructions are further configured to store the prediction in a datastore.

12. The vehicle of claim 8 wherein the statistical data includes:
an observed maximum green signal duration, MAX_g_obs; and
for each second in a set [0,MAX_g_obs] in each phase, an empirical probability p for vehicle arrival/presence.

13. A method comprising:
loading and executing an emulator process in a processor in a vehicle to emulate operation of a field traffic signal controller (FSC) at a physical location;
at a back-end server system capable of wireless communication with the vehicle, acquiring call data and signal status data provided by the FSC during a selected collection period, and storing the acquired call data in a database;
at the back-end server system, predicting future detection data for the FSC based on a statistical analysis of the acquired call data stored in the database;
in the processor in the vehicle, as the vehicle is approaching the location of the FSC, sending a request message to the back-end server, the request message identifying the FSC;
in the processor in the vehicle, receiving a reply message from the back-end server, the reply message comprising prediction system input data for the FSC, the input data including the predicted future detection data to predict likely upcoming state changes of the FSC;
in the processor in the vehicle, identifying a signal status at a last sync point of the FSC in the database;
in the processor in the vehicle, initializing the emulator process to an initial state;
in the processor in the vehicle, advancing the emulator process from the initial state to a second state, the second state corresponding to a last sync point of the FSC;
in the processor in the vehicle, further advancing the emulator process from the second state, based on the prediction system input data in the received response, for a time period from the last sync point to a current time, so that at the current time the FSC and the emulator process running in the vehicle are synchronized to a current time state;
in the processor in the vehicle, receiving real-time state information from the FSC;
in the processor in the vehicle, adjusting a current state of the emulator process to match a current state of the FSC based on the real-time state information;
in the processor in the vehicle, fast forwarding the emulator process from the adjusted current state, based on the predicted future detection data, by clocking the emulator process at a rate faster than real-world time, so that it "gets ahead" of the current state of the FSC;

in the processor in the vehicle, terminating the emulator process at a future time state;

in the processor in the vehicle, predicting a signal status based on the future time state of the emulator process; and in the processor in the vehicle, communicating a result based on the predicted signal status to a network on board the vehicle for display in the vehicle or input to engine control units or other on-board computers for use in controlling operation of the vehicle.

14. The method of claim 13 wherein the result includes an indication of the predicted signal status and a predicted time interval remaining until the FSC changes state to the predicted signal status.

15. The method of claim 13 wherein receiving real-time state information from the FSC comprises receiving a short-range broadcast message from the FSC.

16. The method of claim 15 wherein the short-range broadcast message comprises a Dedicated Short-Range Communications system (DSRC) compliant message.

17. The method of claim 13 wherein receiving real-time state information includes receiving image data from a camera in the vehicle determining the current state of the target traffic signal based on the image data.

18. The method of claim 17 wherein the camera is mounted to the vehicle.

* * * * *